Patented Mar. 11, 1930

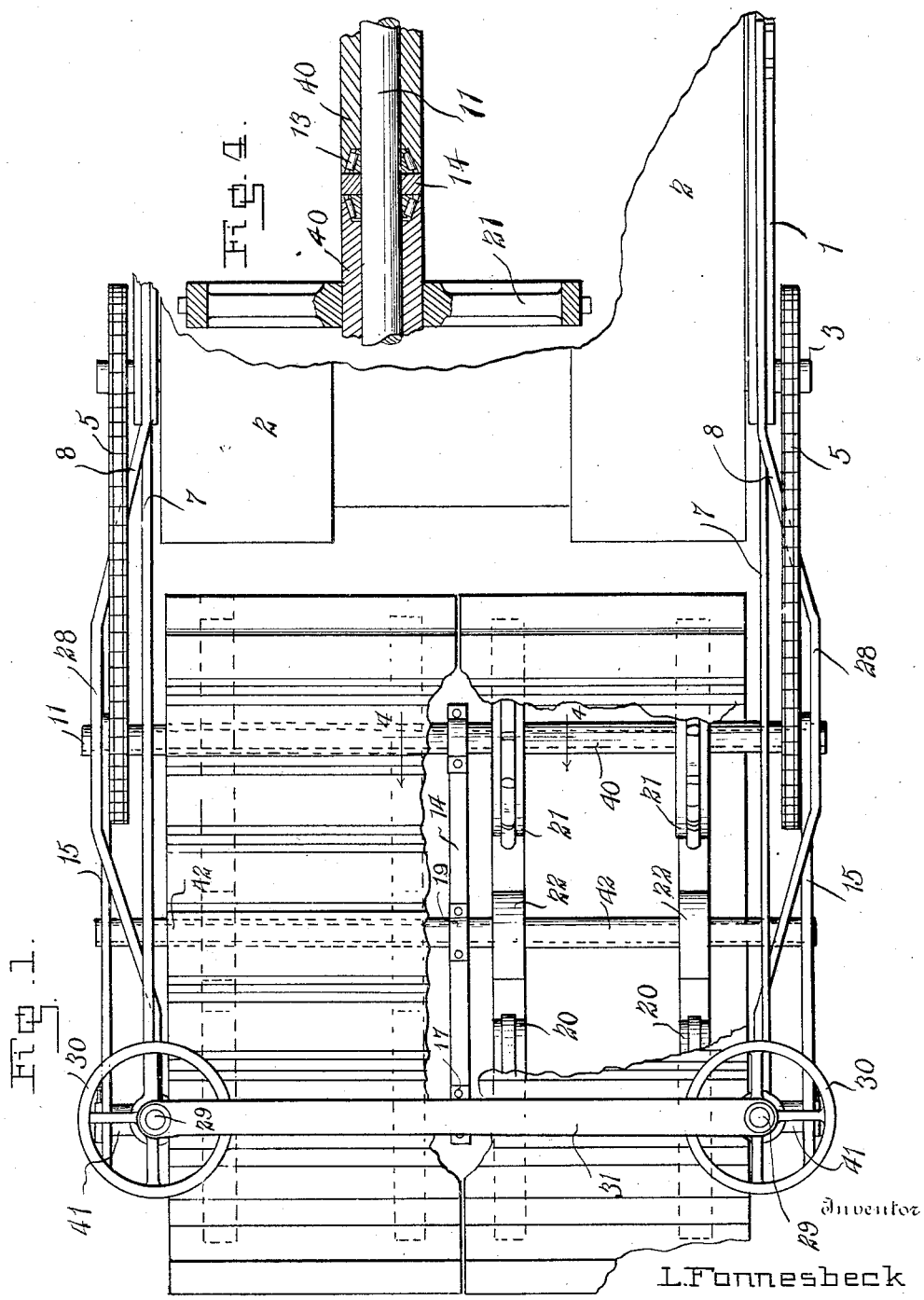

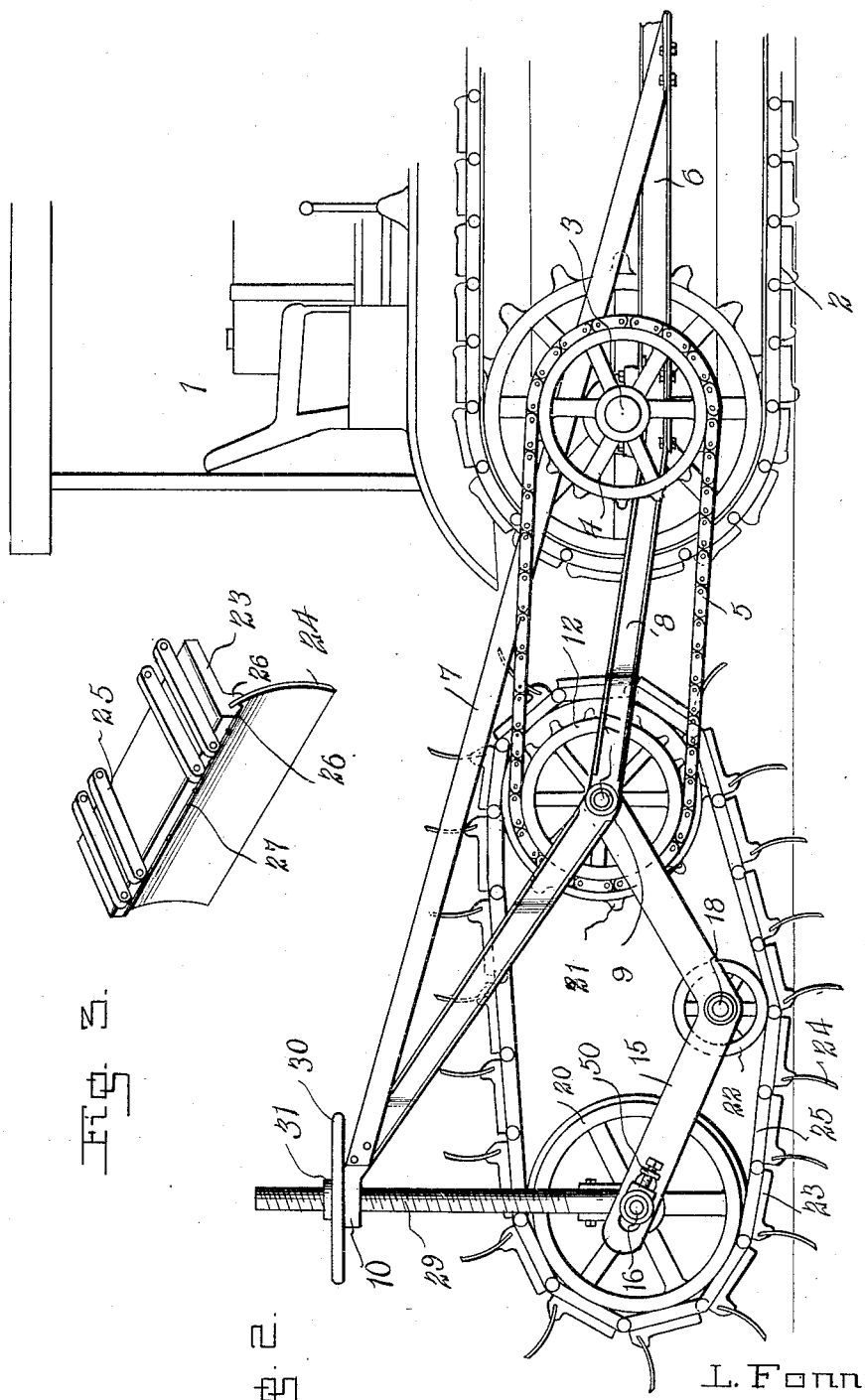

1,750,219

UNITED STATES PATENT OFFICE

LEON FONNESBECK, OF LOGAN, UTAH

ROTARY PLOW

Application filed March 21, 1928. Serial No. 263,506.

This invention has for its object the provision of a plow which may be drawn at the rear of a tractor and operated from the tractor to penetrate the soil and dig up and turn over the same. The invention provides endless series of ground-engaging blades which will be caused to travel in unison with the travel of the tractor and will be supported at the rear of the tractor in such manner that the depth of penetration of the soil may be easily regulated. Other objects of the invention will appear incidentally in the course of the following description.

In the drawings:

Figure 1 is a plan view of my improved plow with parts broken away;

Fig. 2 is a side elevation of the same showing a portion of a tractor to which the plow is connected and by which it is driven;

Fig. 3 is a detail perspective view of one of the plow blades, and

Fig. 4 is a detail section.

In the drawings, the reference numeral 1 indicates the rear portion of a tractor which may be of any known or approved form and will preferably be of the type having an endless chain tread member, as indicated at 2.

In carrying out my invention, the rear axle 3 of the tractor is extended or has coupled thereto supplemental axles which project beyond the sides of the tread members, and upon these extensions I secure sprocket wheels 4 about which sprocket chains 5 are trained. I also secure to the frame bar 6 of the tractor an upwardly and rearwardly projecting beam 7 and a lower supplemental frame bar 8 which is secured to the rear extremity of the frame bar 6 and extends rearwardly therefrom at a slight upward inclination to a point indicated at 9 and then carried more abruptly upwardly and rearwardly to be rigidly connected to the rear extremity of the respective frame bar 7. The rear extremity of the frame bar 8 is formed with an eye or loop 10, the purpose of which will presently appear, and at the bend or angle of the bar a rod or shaft 11 is fitted therein, said rod or shaft extending entirely across the machine from the bar 8 at one side to the bar 8 at the opposite side.

Hollow shafts 40 are mounted on the rod 11 and upon the outer end of each shaft 40 is secured a sprocket 12 about which the driving chain 5 is trained. The inner ends of the shafts 40 abut the forward end of a brace or frame bar 14 and roller bearings may be provided to receive the end thrust, as indicated at 13. The brace or frame bar 14 is approximately V-shape and a bar 15 of like form is provided at each side of the plow, the forward ends of the bars 15 being pivotally mounted upon the shaft 11 and the rear ends thereof carrying the outer ends of a rod 16 which passes through a fitting 17 at the rear end of the central brace or bar 14, hollow shafts 41 being mounted on the rod 16. An intermediate rod 18 is fitted at its outer ends in the angle of the outer frame bars 15, while its center is supported in a fitting 19 carried by the bar 14 at the angle of the same, hollow shafts 42 being mounted on the rod 18. Secured upon the shafts 41 are idle pulleys 20 and secured to the shafts 40 in longitudinal alinement with the pulleys 20 are sprocket wheels 21, while upon the shafts 42 alined with the pulleys 20 and sprockets 21 are idler presser rollers 22. As shown in Fig. 1 and as will be understood, the plows are provided in pairs, each plow and its operating and supporting structure being disposed at one side of the central longitudinal plane of the tractor. Each plow comprises a series of plates or shoes 23 which are pivotally connected to form an endless chain and blades 24 each carried by one of the shoes. Upon the shoes, on the inner faces thereof, are formed links 25, the links upon adjacent shoes having their ends pivoted together, as will be understood, and being adapted to be engaged by the teeth of the sprockets 21 whereby the plows will be driven. It will be noted that the blades 24 are slightly concaved on their working faces which are presented to the rear as they engage the ground, and the shoes are provided with ribs 26 on their outer faces which are spaced apart to provide a groove receiving the inner edge of the respective blade, the blade being secured within the groove by bolts or rivets, indicated at 27. The blade will thus be very firmly secured but may be easily removed when repairs or renewals may be necessary. The idler rollers 22 bear upon the inner sides of the links 25 and are so located that the point of greatest penetration of the blade is directly under said rollers.

The braces or frame bars 8 are bowed laterally in their intermediate portions, as shown at 28 in Fig. 1, so as to clear the sprockets 12 and the frame bars 14 and 15 are pivotally mounted upon the rod 11, and adjacent the rear ends of the outer bars 15 I provide worm shafts or threaded rods 29 which have pivotal or loose engagement with the rod 16 at their lower ends and have their upper end portions extended through the eyes 10 at the rear ends of the frame bars 8. Hand wheels 30 are engaged with the respective threaded rods 29 and a brace 31 is fitted at its ends over the said rods and over the hand wheels 30 so that the rods will be maintained in their proper spaced relation. Obviously, by rotating the wheels, which have threaded engagement with the rods, the rods will be caused to move vertically through the eyes 10 and the ends of the cross bar 31 so that the shafts 16 will be raised or lowered and the plow blades 24 thereby set to penetrate the soil to any desired degree or be held above the same when the plow is to be moved from field to field or over a road.

It will be readily understood that, although the plows are driven in the same direction as the tractor travels, they operate at a slightly higher speed than the tractor tread and, consequently, the blades will act to take up and turn over the soil engaged by them while at the same time they will assist in propelling the tractor and thereby economize in the consumption of power. By employing the several transverse rods extending entirely across the plow with hollow shafts on said rods, I avoid sagging of the plow along a central longitudinal line and also facilitate turning of the plow when it is to make a return trip across the field, each plow belt traveling at a speed proportionate to the speed of the corresponding tractor tread.

As indicated at 50, the ends of the rod 16 may be adjustably mounted to keep the proper tension on the plow belts and compensate for wear and to facilitate the release of the same when repairs may be necessary.

Having thus described the invention, I claim:

1. A rotary plow comprising an endless series of pivotally connected shoes having transverse spaced ribs on their outer faces, blades extending the full width of the shoes having their inner edges fitted between said ribs and secured thereto and having concave working faces, means for supporting the series of shoes at the rear of a tractor, and means for driving the same from the tractor.

2. A rotary plow comprising pairs of upper and lower upwardly and rearwardly inclined frame bars adapted to be secured at their front ends to the frame of a tractor, the members of each pair having their rear ends secured together at the rear of the tractor, other frame bars pivotally attached to the lower first-mentioned frame bars at intermediate points in the length thereof, means carried by the rear ends of the first-mentioned frame bars and connected with the rear ends of the second-mentioned frame bars for pivotally adjusting the second-mentioned bars, shafts carried by and between the several corresponding bars, pulleys on said shafts, an endless chain of blades carried by said pulleys, and means for imparting rotation to one of the shafts and the chain of blades from a tractor.

3. A rotary plow comprising a supporting frame, a shaft mounted in said frame, wheels secured upon said shaft, an endless chain of soil-engaging blades mounted upon and actuated by said wheels, braces pivotally mounted at their front ends upon said shaft, a shaft carried by the rear ends of said braces, pulleys on said shaft supporting the endless chain of blades, idler rollers carried by said braces and bearing upon the inner sides of the endless chain of blades, threaded rods mounted in the rear end of the supporting frame and connected at their lower ends with said braces, and nuts engaged with said threaded rods and resting on the frame whereby to vertically adjust the braces and the blades.

4. A rotary plow comprising an endless series of shoes each consisting of a flat plate having parallel ribs on one face at its advancing edge and having links on its opposite face projecting from its advancing and trailing edges, and a blade extending from end to end of the shoe with one edge inserted between and secured to the parallel ribs, the links on each shoe being pivoted to links on adjacent shoes.

In testimony whereof I affix my signature.

LEON FONNESBECK. [L. S.]